Figure 3:
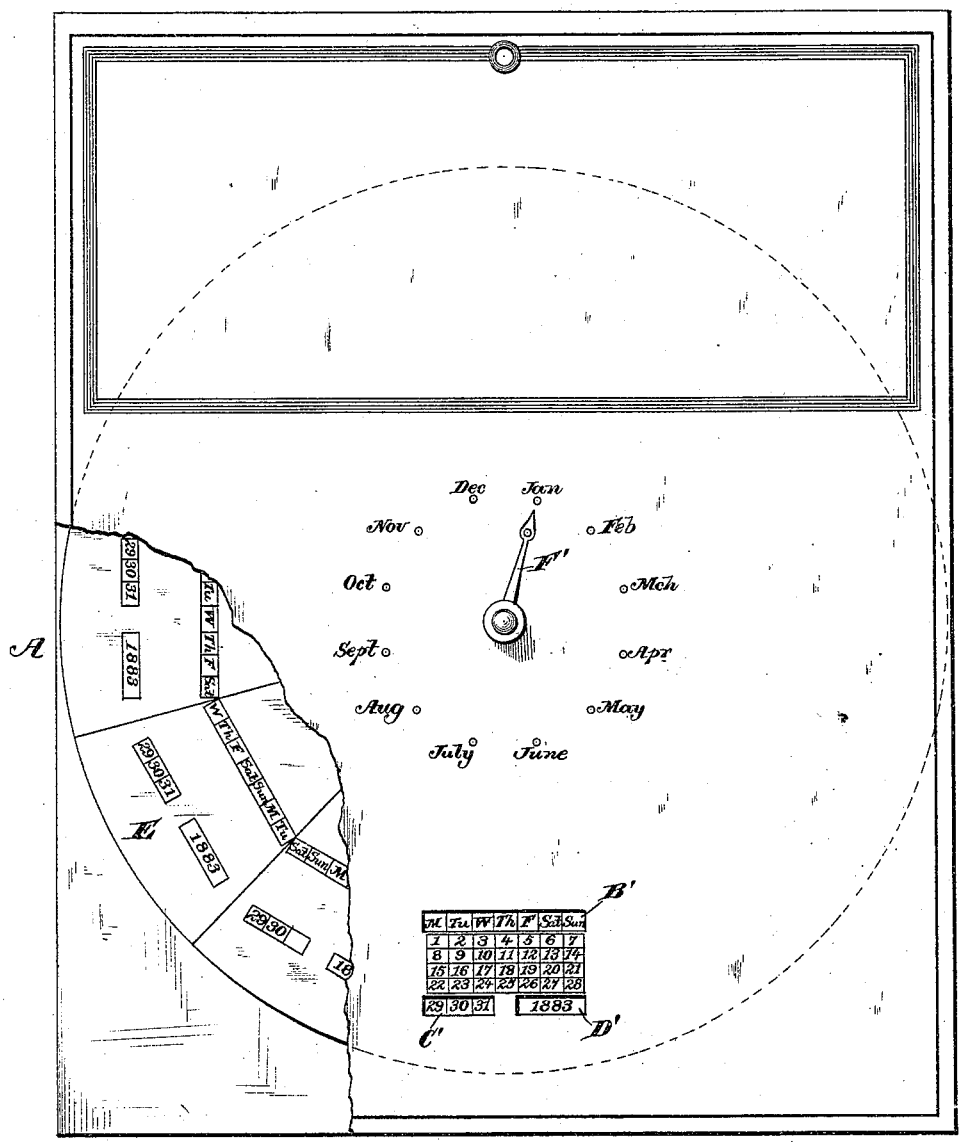

(No Model.)  
2 Sheets—Sheet 1.

H. H. HAM, Jr.
CALENDAR.

No. 287,281. Patented Oct. 23, 1883.

Fig. 2.

Fig. 1.

Witnesses.  
Robert Everett  
J. A. Rutherford

Inventor.  
Henry H. Ham, Jr.  
By James L. Norris, Atty.

N. PETERS, Photo-Lithographer, Washington, D. C.

(No Model.) 2 Sheets—Sheet 2.
H. H. HAM, Jr.
CALENDAR.

No. 287,281. Patented Oct. 23, 1883.

Witnesses. Inventor.
Robert Everett, Henry H. Ham Jr.
J. A. Rutherford By James L. Norris,
Atty.

UNITED STATES PATENT OFFICE.

HENRY HORATIO HAM, JR., OF PORTSMOUTH, NEW HAMPSHIRE.

CALENDAR.

SPECIFICATION forming part of Letters Patent No. 287,281, dated October 23, 1883.

Application filed January 18, 1883. (No model.)

*To all whom it may concern:*

Be it known that I, HENRY HORATIO HAM, Jr., a citizen of the United States, residing at Portsmouth, in the county of Rockingham and State of New Hampshire, have invented new and useful Improvements in Calendars, of which the following is a specification.

My invention relates to calendars; and it consists in a face-card having delineated thereon the months of the year in their proper order, with a pointer or index which may be moved or revolved to register with each month successively, said face-card having printed in any suitable part the number of days in the shortest month of the year, arranged in the usual manner, with openings above and below, through the former of which may be seen the characters indicating the days of the week, and through the latter the numbers registering with those on the face-card required to make up the several months of twenty-eight, twenty-nine, thirty, or thirty-one days, together with the year to which the calendar is computed, said characters and additional numbers being printed upon a rear card, which is moved by the index and brought into proper position for reading each month, by causing said pointer to register with the name of the required month printed upon the face-card, as set forth in the claim.

Referring to the drawings, Figure 1 is a front elevation, showing the parts in proper position for reading the month of January, 1883. Fig. 2 is a front elevation of the rear card, the face being removed. Fig. 3 is a front elevation of a modified form of my invention, part of the face-card being broken away, to show the arrangement of the numbers and characters on the rear card.

A in said drawings indicates the face-card of the calendar. Upon the surface of this card I print the numbers from 1 to 28, said numbers being arranged in four equal series, reading from left to right. In each series the numbers fall directly below those above, in the manner usually employed in printing calendars. Above this printed space I cut an opening, B, co-extensive therewith, and of any suitable width. Below said space, and in the same manner, I cut two separate slots, C and D, of equal length.

E indicates the back card, which is divided transversely into seven equal spaces, each space being equal to that occupied by the corresponding column of figures printed upon the face-card. Vertically the card is divided into twenty-eight transverse spaces, each of a width equal to the spaces occupied by any one of the four series of figures printed on the face-card. In each alternate space are printed the characters or abbreviations indicating the days of the week, reading from left to right, and in the spaces alternating with these are printed the numbers which, taken with those printed on the face-card, make up the full number of the days of each month, said numbers being printed each in its separate space formed by the vertical and transverse division of the card, as already named. It will readily be seen that by shifting the initial character or abbreviation indicating the first day of the week, and causing the others to follow and precede in their natural order, the rear card is adapted to be moved in such manner that the numbers printed upon the face-card, taken with the complementary numbers upon the rear card, will correctly indicate the day of the month for each week-day printed upon the rear card for each month in the year, the adjustment for the several months being made by moving the rear card down or up, the proper position being indicated by a pointer or index, F, which is attached to the rear card and slides in a slot, G, cut in the face-card, the names of the several months being printed upon the face-card opposite the index, and at suitable intervals. The second of the two lower spaces is used to exhibit the numbers indicating the year to which the calendar is arranged.

In the modified form of this invention shown in Fig. 3, the back card, instead of moving vertically, may be arranged to turn upon a pivot. In this construction the face-card is printed and slotted in the manner already described, save that the names of the month are arranged in a circle described by the index F', which revolves the rear card. The rear card, however, instead of being divided, as in Fig. 2, is marked off into twelve equal parts by radii, between which are printed the abbreviations denoting the days of the week, in such position as to appear through the opening B', while the complementary numbers, from 28 to 31, are printed below and to the left, so as to be exhibited through the opening C', and the number of the year through the opening D' on the right. By turning the index F' until it registers with the point opposite the name of the desired month, the slot B' will show the days of the week arranged in proper order for that month, while the slots C' and D' will exhibit, the former the complementary figures, indicating the number of days in that month, and the latter the number of the year.

By constructing the calendar in this manner, not only is ample space left for advertising purposes, but the convenience of the user is greatly promoted. No complete yearly calendar—that is, a calendar set up in blocks in fine print for the whole twelve months—is needed, as is the case with those now used. If it is necessary to consult the calendar for any month other than that for which it is set, the index or pointer can be moved or revolved in an instant until it registers with the name of the month desired, and the needed information is thus obtained. When a new year comes in, the old slide or rear card is removed and a new one substituted, in which the abbreviations indicating the days of the week are changed to correspond with the new order of arrangement.

Having thus described my invention, what I claim is—

A calendar composed of a face-card bearing the names of the months of the year, and figures designating the days in the shortest month of the year, and provided with parallel slots arranged, respectively, above and below the said figures, a movable back card divided into equal spaces, each of which bears the characters designating the days of the week, and the numbers which, taken with those on the face-card, make the full number of days of each month, and a pointer or index directly connected with the rear card for moving the same and registering with the names of the months on the front card, substantially as herein shown and described.

In testimony whereof I have hereunto set my hand in the presence of two subscribing witnesses.

HENRY HORATIO HAM, Jr.

Witnesses:
A. F. HOWARD,
SAMUEL H. MARSHALL.